(12) United States Patent
Lefevre et al.

(10) Patent No.: US 7,754,628 B2
(45) Date of Patent: Jul. 13, 2010

(54) MIXTURE FOR THE PRODUCTION OF AN AMBER GLASS, AMBER GLASS, METHOD FOR THE PRODUCTION OF TUBES AND BLANKS OF TINTED BULBS, AND TINTED BULBS OBTAINED WITH SAID GLASS

(75) Inventors: Christian Lefevre, Piney (FR);
François Lepesqueux, Troyes (FR)

(73) Assignee: Vermont, Montieramey (FR)

( * ) Notice: Subject to any disclaimer, the term of this patent is extended or adjusted under 35 U.S.C. 154(b) by 715 days.

(21) Appl. No.: 10/584,497

(22) PCT Filed: Dec. 24, 2004

(86) PCT No.: PCT/FR2004/003386

§ 371 (c)(1),
(2), (4) Date: May 4, 2007

(87) PCT Pub. No.: WO2005/063641

PCT Pub. Date: Jul. 14, 2005

(65) Prior Publication Data

US 2008/0024066 A1    Jan. 31, 2008

(30) Foreign Application Priority Data

Dec. 24, 2003 (FR) .................... 03 15423

(51) Int. Cl.
  *C03C 6/00*   (2006.01)
  *C03C 6/02*   (2006.01)
  *C03C 3/078*  (2006.01)
  *C03B 19/01*  (2006.01)
  *C03B 19/09*  (2006.01)
  *C03B 9/00*   (2006.01)
  *C03B 11/00*  (2006.01)

(52) U.S. Cl. .................... 501/27; 501/72; 65/17.3; 65/66

(58) Field of Classification Search ............. 501/27–31, 501/66, 70–72; 65/17.3, 66
See application file for complete search history.

(56) References Cited

U.S. PATENT DOCUMENTS 3,479,193 A * 11/1969 Smith et al. .................... 501/27

(Continued)

FOREIGN PATENT DOCUMENTS

DE    10053450 A1    5/2002

(Continued)

OTHER PUBLICATIONS

U.S. Appl. No. 11/489,723, filed Jul. 20, 2006, entitled "Red Glass, Process for Manufacturing Red Glass, and Tinted Bulbs and Tubes Obtained with such a Glass".

*Primary Examiner*—Karl E Group
*Assistant Examiner*—Noah S Wiese
(74) *Attorney, Agent, or Firm*—Banner & Witcoff, Ltd.

(57) ABSTRACT

The invention relates to a mixture for the production of a vat-dyed amber glass; an amber glass formed from the vitrifiable mixture, based on a silico-sodo-calcic composition; and a method for the production of tubes and blanks (2) for bulbs (1) using said glass. The mixture contains 100% by weight of the following ingredients: 0.01%-1% by weight molybdenum bisulphur and 0.01%-7% strontium sulphur by weight. The glass thus obtained is devoid of harmful products such as cadmium and no additional heat treatment is required in order to obtain the desired colour thereof.

13 Claims, 4 Drawing Sheets

| U.S. PATENT DOCUMENTS | | | |
|---|---|---|---|
| 3,502,454 A * | 3/1970 | Shonebarger | 65/30.14 |
| 3,779,734 A | 12/1973 | Simonfi et al. | |
| 2002/0042338 A1 * | 4/2002 | Oyama et al. | 501/72 |
| 2002/0117950 A1 * | 8/2002 | Ulenaers et al. | 313/112 |

FOREIGN PATENT DOCUMENTS

| EP | 1 193 226 | 4/2002 |
|---|---|---|
| EP | 1193226 A1 * | 4/2002 |
| FR | 1498643 A | 1/2008 |
| WO | 2004041739 A1 | 5/2004 |

* cited by examiner

MIXTURE FOR THE PRODUCTION OF AN AMBER GLASS, AMBER GLASS, METHOD FOR THE PRODUCTION OF TUBES AND BLANKS OF TINTED BULBS, AND TINTED BULBS OBTAINED WITH SAID GLASS

This application is a National Stage application of co-pending PCT application PCT/FR2004/003386 filed Dec. 24, 2004, which was published in French under PCT Article 21(2) on Jul. 14, 2005, and which claims priority from French patent application no. 0315423 filed Dec. 24, 2003. These applications are incorporated herein by reference in their entireties.

The present invention relates to a glass batch based on a soda-lime-silica composition for obtaining a bulk-tinted amber glass.

It also relates to such a glass, to a process for manufacturing a blank and/or a tube made of amber glass, and to a product, such as said tube or a bulb obtained from said blank.

The term "amber color" should be understood to mean colors ranging from yellow to orange as defined by the international standards and especially in the International Commission on Illumination reference work known as CIE1931.

Specifically, the International Commission on Illumination has defined a color standard for light that can be used on vehicles through the SAE J578 standard, the boundaries of which for amber are the following:

red boundary: y=0.390;
white boundary: y=0.79−0.67x;
green boundary: y=x−0.12.

Figure 2:
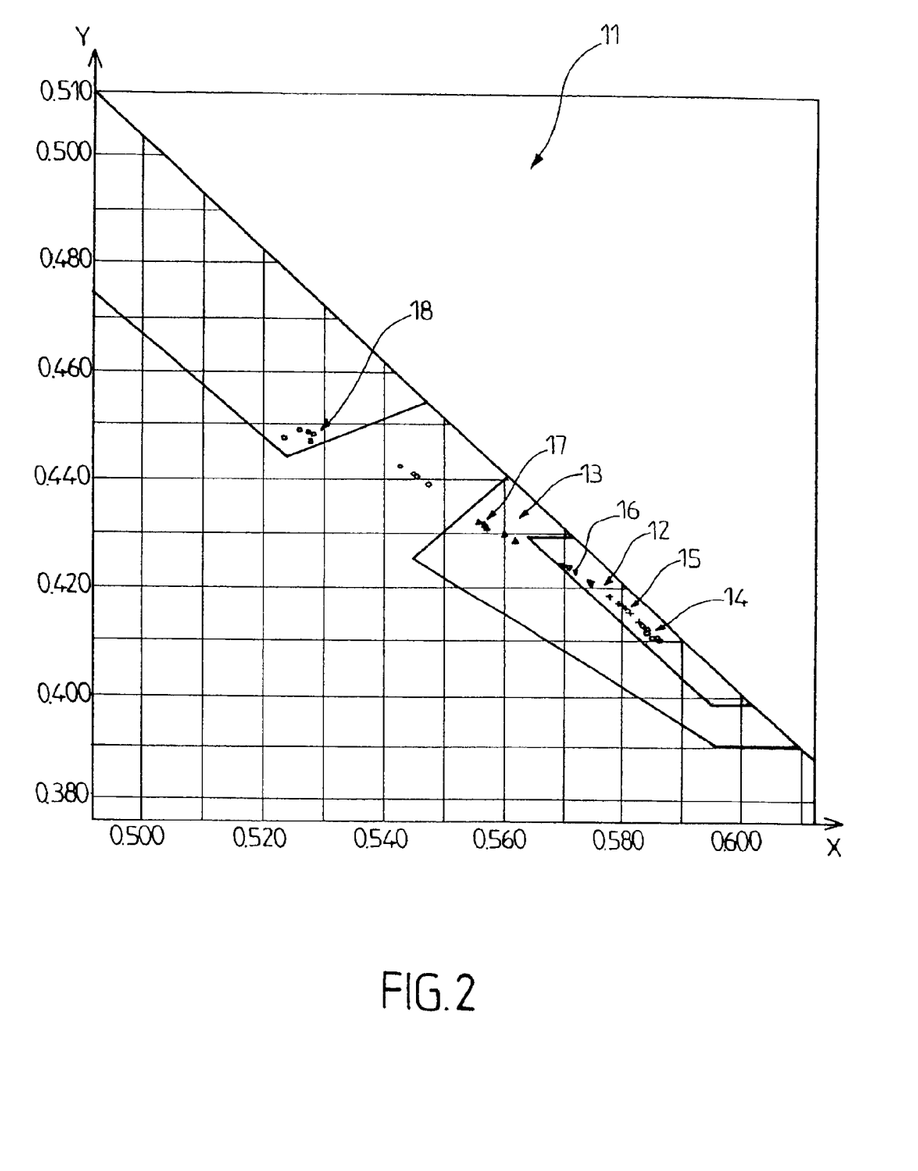
FIG. 2 is the diagram showing the standardized calorimetric space within which the colors of the bulbs according to the invention reliably and constantly lie.

This relates to a broadened first quadrilateral, the graphical representation of which is on the diagram showing the standardized calorimetric space, said quadrilateral being given in FIG. 2 accompanying the present description.

The CEN (European Committee for Standardization) has itself defined the regulation ECE37 and set the boundaries of the reduced calorimetric tolerance field relating to flasher bulbs used by road traffic as follows:

yellow boundary: y≦0.429;
red boundary: y≦0.398;
white boundary: z≦0.007.

Here again, these boundaries may be represented by a second quadrilateral, included in the first one (cf. FIG. 2).

Conventionally, these colors are obtained in soda-lime-based glasses by the addition of cadmium and selenium in CdS/Se/CdS or 3CdSe form.

The French company Vermont, which has been manufacturing industrial glass since 1918 with its main activity in the field of blowing bulk-tinted glass for domestic and automotive illumination, has therefore been able to develop and commercialize amber glass based on such a technology since the end of the 1980s, especially for the manufacture of indicating lamps.

However, the production of this type of bulb, like that of tubes made of soda-lime-based glass colored by the addition of cadmium/selenium, has been challenged since 1994 by the appearance of a process for manufacturing orange/lacquered lamps whose costs have proved to be less than that of bulk-tinted bulbs, and also by a European directive (91/338/CEE of Jun. 18, 1991) resulting in the restriction in the use of certain heavy metals, including cadmium.

The lacquering operation consists in coating a clear glass bulb with a varnish or lacquer based on organic pigments in order to give it the amber tint.

This process, which moreover has never convinced Vermont or been implemented thereby, has however drawbacks.

This is because it is now established, after several years of study and use, that the quality and durability of the coating degrades over time.

As it ages, the tint becomes appreciably lighter in color, while the repeated thermal shocks also end up delaminating the coating, by flaking, or by cracking it.

Considering its reputation and its prior experience in the field of bulk tinting, the company Vermont therefore developed the present invention in order to obtain a yellow/orange range.

The aim of the invention is to alleviate the abovementioned drawbacks and to propose a glass batch for obtaining amber glass, such a glass, and a process for manufacturing tubes and/or blanks made of amber glass, and a tube or a bulb thus tinted which meet the practical requirements better than those known previously, especially in that the invention proposes a glass containing no toxic material subject to regulations and/or no environmentally hazardous materials, such as lead, cadmium, selenium or chromium, in that the glass obtained has a color produced directly without an intermediate or additional operation in which the temperature is raised for a durable period (the term "durable period" should be understood to mean a few minutes, for example thirty minutes or one hour), in that said color falls within the international standards on signaling that are in force, is stable over time and does not vary (requiring no treatment for the post-forming coloration) and is insensitive to thermal shocks, and in that it allows a high manufacturing production rate to be achieved (for example in the case of blank manufacture, around 90 blanks per minute) for an improved cost.

For this purpose, the present invention proposes in particular a glass batch based on a soda-lime-silica composition for obtaining a bulk-tinted amber glass, characterized in that said batch comprises, per 100% by weight of batch, 0.01% to 1% molybdenum disulfide by weight and 0.01% to 7% strontium sulfide by weight.

In advantageous embodiments, one or other of the following features may be employed:

the percent of strontium sulfide does not exceed 4% of the weight of the batch;
the percent of molybdenum disulfide does not exceed 0.3% of the weight of the batch;
the iron content of the batch is less than 0.04%; and
the batch contains no sulfur (the expression "contains no sulfur" should be understood to mean a percent content of sulfur by weight of less than 0.01% or even less than 0.005%); and
the batch includes up to 0.2% aluminum in powder form.

The invention also proposes a bulk-tinted amber glass obtained from the above batch, which comprises, per 100% by weight of molten glass:

| | |
|---|---|
| $SiO_2$: | between 65 and 72%; |
| $B_2O_3$: | between 0.5 and 3%; |
| $Na_2O$: | between 5 and 15%; |
| $K_2O$: | between 5 and 15%; |
| $L_2O_2$: | between 0.2 and 2%; |
| $CaO$: | between 1 and 5%; |
| $BaO$: | between 0.5 and 4%; |
| $Al_2O_3$: | between 0.5 and 3%; |
| $MoO_3$: | between 0.05 and 0.5%; |
| $SO_3$: | between 0.1 and 0.7%; |
| $SrO$: | between 2 and 7%, | the $MoO_3$ and $SO_3$ being obtained from molybdenum disulfide $MoS_2$ and strontium sulfide SrS such that the $MoS_2/SrS$ ratio in the batch is between 0.015 and 0.04. Advantageously, the ratio is between 0.015 and 0.025.

Even more advantageously, the batch contains no sulfur.

The invention also proposes a process for obtaining the amber glass as described above.

It also proposes a process for manufacturing a tube or a blank made of amber glass from a batch based on a soda-lime-silica composition, characterized in that the batch is produced by adding to the composition comprising between 65 and 72% $SiO_2$ and between 5 and 15% $Na_2O$, per 100% by weight of batch, 0.01% to 1% molybdenum disulfide by weight and 0.01% to 7% strontium sulfide by weight, then the glass is produced in an manner known per se in a furnace from said batch, and the tube or the blank is formed directly with its definitive color without any additional heat treatment other than controlled cooling in order to eliminate the thermal stresses.

Conventionally, this cooling consists in slowly cooling (over around 20 minutes) the glass blanks formed from about 550° C. down to room temperature. In general, the cooling is carried out in a tunnel for relieving the internal tensile stresses.

It should be noted that, in the prior art, a heat treatment lasting at least one hour, for example at about 500° C., necessary for correctly developing the tint of the glass, is systematically provided.

That is not the case with the present invention, the composition of the batch making it possible, surprisingly and unexpectedly, to dispense with this heat treatment.

Advantageously, the glass of the tube or blank is maintained at the manufacturing outlet temperature (between 500 and 550° C.) for a few minutes, for example a time of less than five minutes, and more particularly one to two minutes, before the glass is cooled.

With the process according to the invention and the device that implements it, it is thus possible to treat about 50 m of tube or 70 to 100 blanks (obtained by blowing a gob of glass) per minute.

Advantageously, the process is characterized in that the percentage of strontium sulfide does not exceed 4% of the weight of the batch.

In one advantageous mode of implementation, the process is characterized in that the percentage of molybdenum disulfide does not exceed 0.3% of the weight of the batch.

Again advantageously, the iron particles are eliminated magnetically so that the iron content of the batch is less than 0.04%.

Also advantageously, the batch contains no sulfur (less than 0.01% and/or in trace amount).

In another mode of implementation, the shade of the tint of the glass is controlled by modifying the oxidation-reduction parameters inside the heating furnace by adjustment of the amount of a metal-powder-based reducing agent up to an amount of 0.3% by weight of the batch.

The invention also proposes an amber glass bulb for a lighting system, for example for domestic purposes or for decoration, obtained from a tube or a blank and from a process such as those described above, or else for use as automobile flasher or signaling means.

The blank formed from a gob of glass immediately on leaving the furnace, the amber tint of which conforms to the required color standards, is thus obtained in a definitive manner without heat treatment or any other complementary operation, known within the context of the processes of the prior art in order to fix the tint.

The invention will be better understood on reading the following description of embodiments of the invention given by way of nonlimiting examples.

Figures 1, 1A:
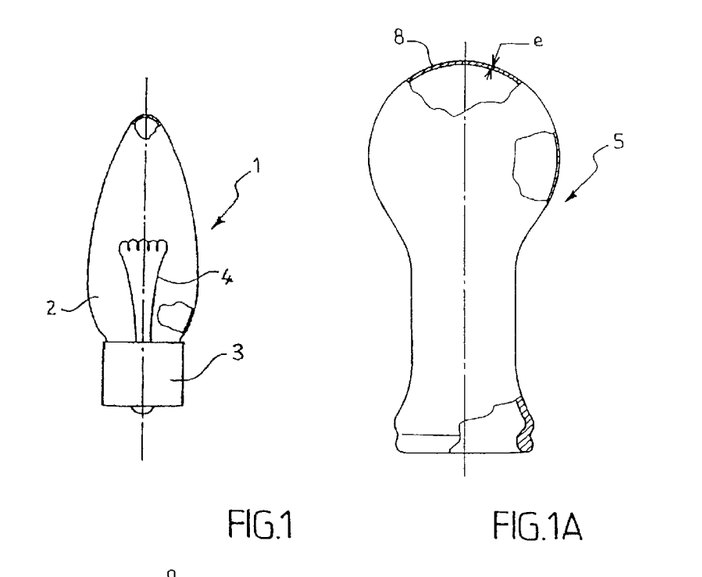
FIG. 1 is a side view of a bulb produced from a glass manufactured according to the invention.
FIGS. 1A to 1C are side views of glass blanks for various shapes of bulbs according to the invention.

The description will refer to the drawings that accompany it, in which:

FIG. 1 shows a bulb 1, comprising a pod-shaped glass blank 2, based on glass of the $SiO_2/R_2O/R'O$ type where R is an alkali metal element and R' is an alkaline-earth metal element.

The blank is of amber color. It is obtained from a glass batch formed with treated silica and comprises, for example, 4% strontium sulfide (SrS), 0.25% molybdenum disulfide ($MoS_2$) and 0.2% powdered aluminum (Al), with an iron content ($Fe_2O_3$) of less than 0.04%.

The bulb 1 comprises, in a manner known per se, a cap 3, for connection to a power supply system, and a filament 4.

It is known that, in the presence of sulfides under melting conditions, these form polysulfides which, with the iron oxides present in the batch, develop a tint ranging from light browns to dark browns depending on the ionic equilibrium of the arrangements of the $Fe^{2+}$, $Fe^{3+}$, $S_4^{2-}$ ions.

Taking this observation into account, in the batch according to the embodiment of the invention more particularly described here, materials will be used that are selected for their low iron content and/or will be purified of their metal particles, for example by passing them through magnetic grids, in order to obtain the desired amber-colored glass tints.

It has also been observed that the formation of alkali metal sulfoferrites according to the reaction:

exerts a not easily controllable influence on the tint, which thus has a tendency to become light brown.

However, equilibrium is favored by using sulfides, thereby making it possible to approach more closely the desired amber tint.

In the embodiment more particularly described, this equilibrium is further enhanced by the presence of a reducing agent such as powdered aluminum, strong oxidation always resulting in a gradual drift of the color toward light browns.

As regards molybdenum, which has a low solubility (<1%) in the glass, those skilled in the art know that an excess amount may be likened at high temperatures to a supersaturated solution that will crystallize upon being cooled or kept at low temperature, the presence of iron accentuating the phenomenon to the point of creating "aventurine glass".

In fact, the inventor has observed that the combined presence of molybdenum sulfide elements with a low iron content, and according to the proportions induced by the batch described above, unexpectedly allows a tint to develop that ranges from yellow to orange-red, passing through oranges, the chromatic coordinates of which tint repeatedly comply with the international signaling standards currently in force, for operating temperatures corresponding to the conventional melting ranges.

Thus, the transmission curves produced on a series of specimens obtained by the process of the invention, based on measurements made using a Perkins Elmer UV/VIS/NIR lambda 19 spectrometer, demonstrate excellent absorption in the ultraviolet and in the visible range up to 500 nanometers.

In other words, all of the blues and some of the greens are absorbed, only the yellows and reds being transmitted.

Although the sudden increase in transmission at around 550 nm is less pronounced, the result obtained is therefore very close to that obtained with CdS-based glasses, the coloration being of the anionic type, in which the equilibrium of $S^{2-}$ and $S^{2-}$ n is the determining factor.

In fact, it should thus be noted that some of the sulfides and polysulfides present favor complex bonds with the molybdenum in a small quantity, in order to form new compounds such as sulfomolybdates and thiomolybdates which without doubt are responsible for the appearance of the desired amber color.

Finally, by varying the $MoO_3/SO_3$ ratio, by varying the $MoS_2/SrS$ ratio of the batch, it is observed that the desired shade of the tint is determined.

When this ratio increases, the drift is toward the oranges. When it decreases, the drift is toward the yellows, said ratio varying between about 0.010 and about 0.04.

With the invention, the use of the glass batch described above, accompanied by well-known control of the melting parameters (temperature and residence time in the furnace) and optimized oxidation-reduction of the glass melt thanks to the suitable proportions, thus makes it possible to manufacture blanks directly with the desired tint without any additional heat treatment.

Figure 1B:
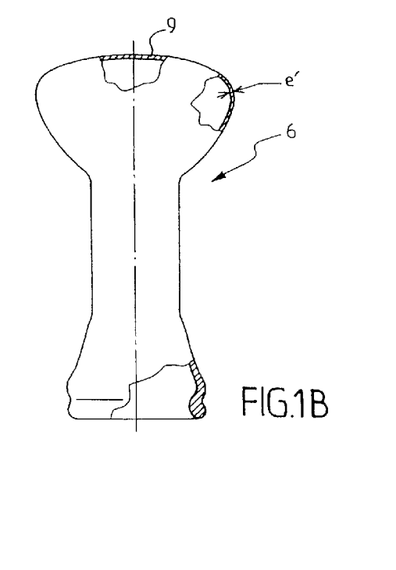
Figure 1C:
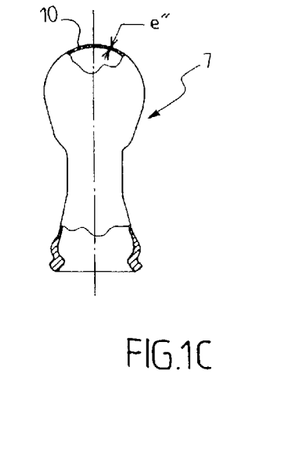

FIGS. 1A, 1B and 1C show other embodiments of glass blanks 5, 6 and 7 obtained by blowing a gob of bulk-tinted glass according to the invention, the blank 1C being designed for example for an automobile flasher.

The thickness e, e' and e'' of the parison 8, 9 and 10 for the bulb blanks in their illuminating part is around 0.4 mm. This thickness depends on the weight of the glass and on its viscosity, with a dispersion that may range by up to about 0.2 mm, the above characteristics also being applicable to the bulb shown in FIG. 1.

In the prior art, it was difficult if not impossible to systematically provide a precise tint for the same parison thickness, which possibly resulted in tints outside the desired color standard owing to the uncontrollable color variation, which oscillated about the mean.

With the invention, since the dispersion is not due only to the difference in thickness, which can be roughly controlled mechanically, the tints are now always within the acceptable range.

Plotted in FIG. 2 is the chromaticity diagram 11 showing the color characteristics of glasses in the amber color triangle of the glasses according to the invention according to the ECE (Economic Commission of Europe) standard (with the reference 12) and according to the SAE (Society of Automotive Engineers) standard (with the reference 13). The boundaries for the amber color in these standards may be represented by broadened quadrilaterals in the diagram, the ECE 12 standard being included within the broader SAE 13 standard, toward the higher purity region of the color.

The circles 14, stars 15 and triangles 16, 17 correspond to the following glass compositions comprising, for example, by weight:
68% $SiO_2$
1.65% $B_2O_3$
9.10% $Na_2O$
8.10% $K_2O$
1% $LiO_2$
2.5% CaO
2.5% BaO
1.8% $Al_2O_3$
5% SrO, in which the $MoS_2$ and SrS components are varied so that the $MoS_2$/SrS ratio is 0.017 in the case of the circles 18, is 0.038 in the case of the stars 15, passing to 0.03 in the case of the triangles 17.

Comparisons with the standards are made visually, colorimetric measurements being taken using an integration sphere and a colorimeter manufactured by the Japanese company Minolta under the reference Chroma-meter CL100 connected to a computer of known type, for example a Minolta computer known by the reference DP100 in order to obtain overall color values.

Measurements over more precise regions were then made using a colorimeter of the THOMA brand with the reference TF6-120.

In both cases, the illuminant is the standardized illuminant A, the proximal color temperature of which is 2856 K. This illuminant is connected to a stabilized power supply, the voltage of which is adjusted to 13.5 V.

The measurements are taken at two points x and y in the CIE 1931 coordinate system. The measurements make it possible to define the saturation, the dominant wavelength and the position of the color of the specimen in the chromaticity diagram, but above all the position relative to the two existing standards that define the amber tint intended for signaling.

Plotted in this color space are therefore the geometrical symbols (stars 15, triangles 17, etc.) representative of a few tint shades that the molybdenum disulfide/strontium sulfide ratio allows to be achieved.

Increasing this ratio demonstrates the capability of producing a multitude of different shades ranging from yellow-green (circled crosses 18) having the mean chromatic coordinates x=0.525, y=0.448, toward oranges, the coordinates of which lie inside the SAE standard (triangles 17) as far as orange-reds within the ECE and SAE standards with mean chromatic coordinates x=0.584, y=0.412 (circles 14), passing via orange-yellows. The stars 15 represent the color measurements made on finished lamps by a control laboratory, with the mean coordinates x=0.579, y=0.416.

A few glass compositions obtained from the batches according to the invention are given below.

EXAMPLE 1

The base of the glass was of the soda-lime-silica type, the main constituents being the following (in percentages by weight):
65-72% $SiO_2$
0.5-3% $B_2O_3$
5-15% $Na_2O$
5-15% $K_2O$
0.2-2% $LiO_2$
1-5% CaO
0.2-2% MgO
2-7% SrO
0.5-4% BaO
0.5-3% $Al_2O_3$
0.05-0.5% $MoO_3$
0.1-0.7% $SO_3$.

Components such as iron, titanium, magnesium and zirconium oxides, $Fe_2O_3$, $TiO_2$, MgO, $ZrO_2$, etc., were present in small amounts (unintentionally added impurities).

The average physical properties of the glass obtained from this base were the following:
- melting point (log η=2): 1360° C.;
- gob point (log η=3): 1110° C.;
- softening point (Littleton log η=7.6): 675° C.;
- annealing point (log η=13.3): 515° C.;
- $T_g$ (log η=13.3): 500° C.;
- strain point (log η=14.5): 460° C.; and
- Δl (20/300° C.)=93×10$^{-7}$.

EXAMPLE 2

This base was advantageously able to be adapted to the soda-lime glass commonly used in the lighting lamp industry with a lower cost, giving the following proportions by weight:
- 68-72% $SiO_2$
- 12-16% $Na_2O$
- 0.5-1.5% $K_2O$
- 0.2-1% $LiO_2$
- 6-9% CaO
- 0.2-2% MgO
- 2-7% SrO
- 0.5-4% BaO
- 1-3% $Al_2O_3$
- 0.05-0.5% $MoO_3$
- 0.1-0.7% $SO_3$.

Components such as $Fe_2O_3$, $TiO_2$, $ZrO_2$, etc. were also present in small amounts (impurities).

The average physical properties of the glass were then the following:
- melting point (log η=2): 1390° C.;
- gob point (log η=3): 1140° C.;
- softening point (log η=4): 975° C.;
- annealing point (log η=7.6): 695° C.;
- $T_g$ (log η=13): 530° C.;
- strain point (log η=13.3): 503° C.; and
- Δl (20/300° C.)=93×10$^{-7}$.

The glasses may be used for mounting lamps intended for signaling in automobiles.

The blanks thus provided in shades of suitable tint may also be used for mounting domestic illumination and/or decorative lamps with a wide variety of shapes and tints achievable.

Thus, the glasses produced may advantageously replace the fancy bulbs intended for decoration and coated with an amber varnish, such as for example those shown in FIGS. 1, 1A and 1B.

The processes for continuously manufacturing blanks will now be described with reference to FIGS. 3 and 4 according to the embodiment of the invention more particularly described here.

Figure 3:
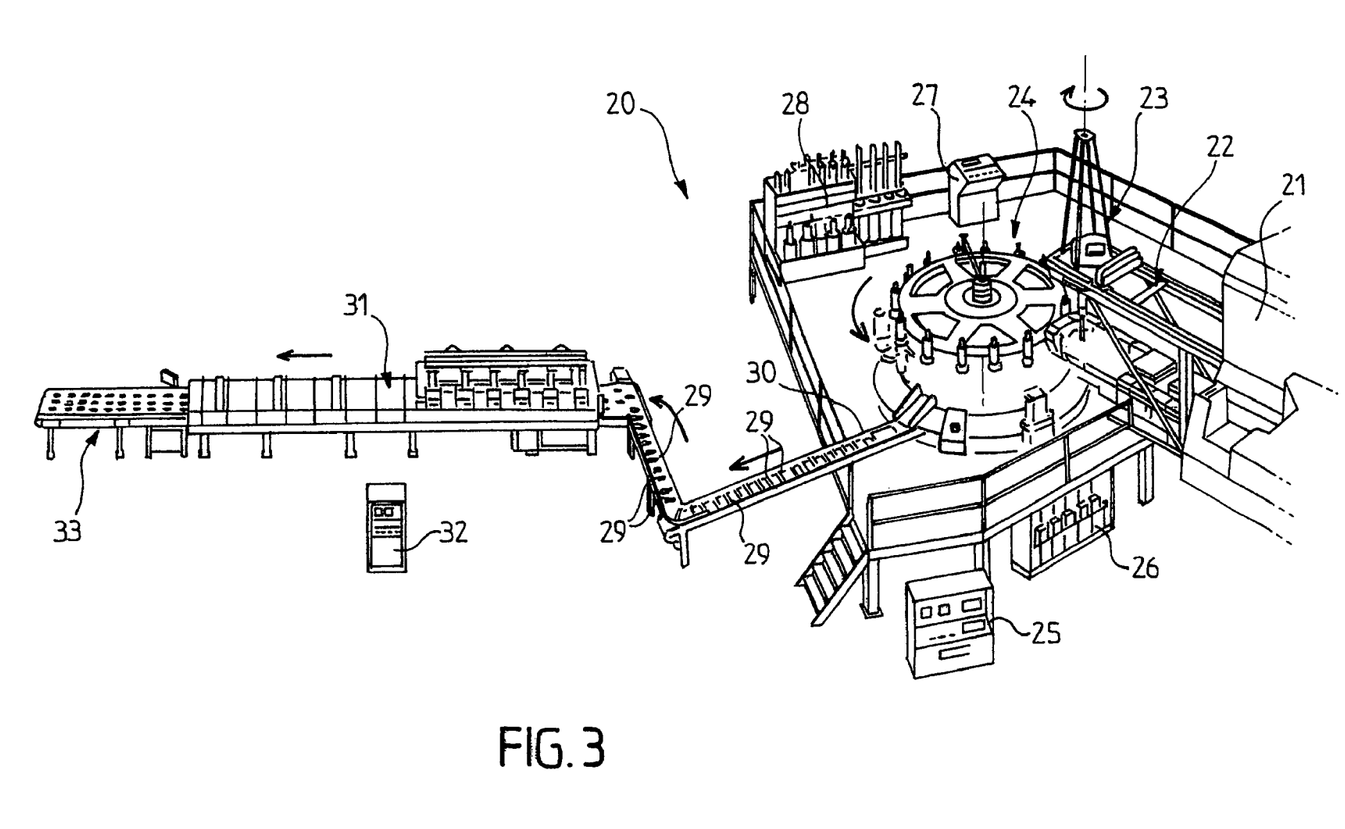
FIG. 3 is a schematic perspective view of an installation for implementing one way of carrying out the process according to the invention.

FIG. 3 shows an installation 20 for implementing the process according to the invention.

It comprises the glass melting furnace 21, a channel 22 for filling with molten glass from the furnace, a distributor 23 feeding the carrousel 24 for forming the blanks, which will be more particularly described with reference to FIG. 4, automatic regulation and control means 25 for the compressed-air supply 26, for the cooling air supply 27 and for the blown-air regulation/distribution 28.

The latter comprises in particular a compressor and means for stabilizing the pressure exerted during blowing by means of an automatic process control system.

The carrousel then feeds formed blanks 29 to a conveyor belt 30 that passes continuously through a cooling tunnel, the purpose of which is to maintain the temperature of the blanks at about 550° C., for example for a time ranging from 1 to 2 minutes so as to relieve the glass of its internal tensile stresses created when suddenly cooled (from 1200° C. to 580° C.) on the machine during molding and then to cool these blanks slowly (over about 20 minutes) down to room temperature, this operation in no way influencing the color.

Automatic control means 32 allow proper operation of the conveyor belt, the blanks continuously obtained at a rate for example of 90 per minute, and with their definitive color, then being cooled in a tunnel 31 for about 20 minutes passing from 500° C./600° C. to 40° C. They are then collected at the exit of the tunnel at 33 to be stored at 34.

Figure 4:
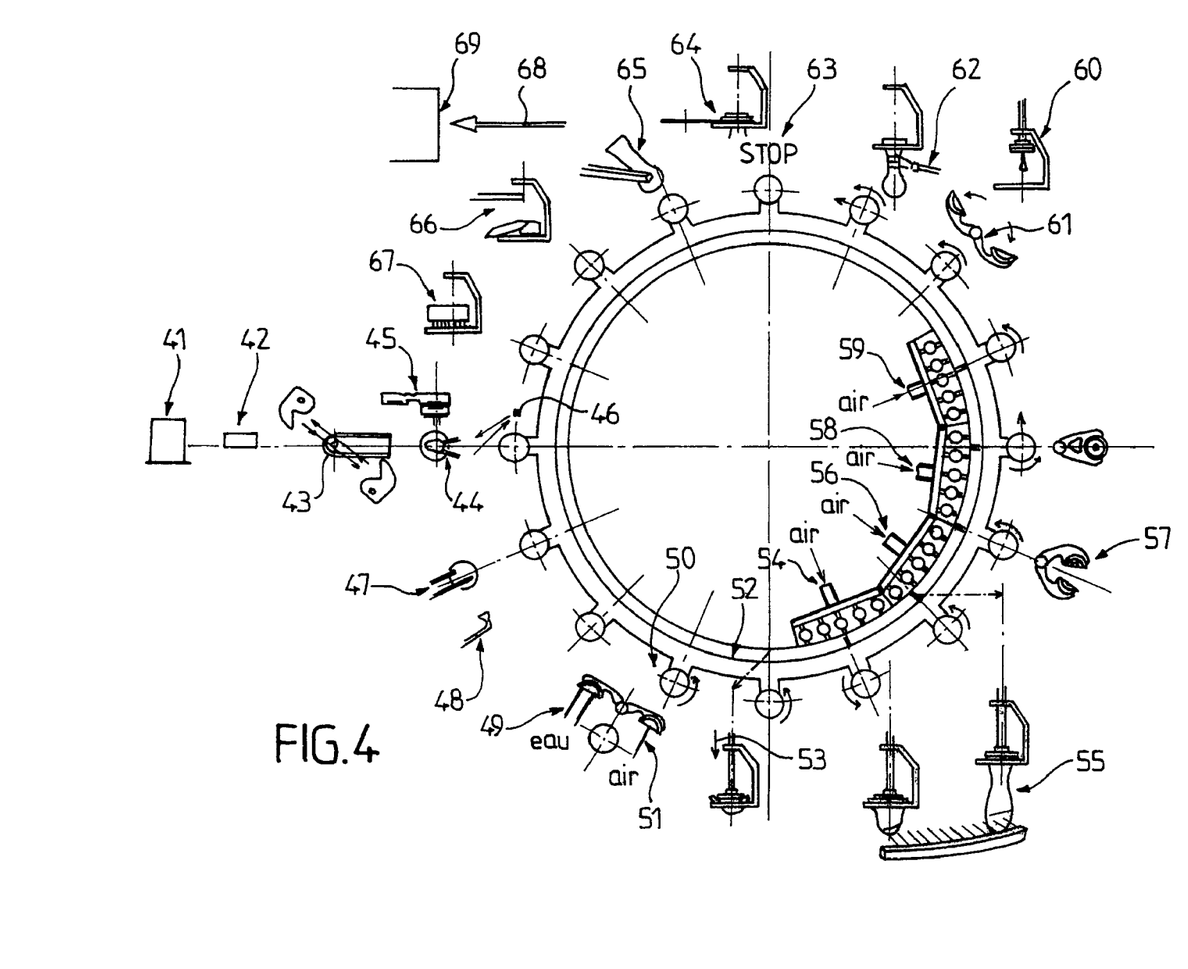
FIG. 4 is a schematic view showing the steps for forming the blanks by blowing using the installation of FIG. 3.

FIG. 4 is a schematic top view of the carrousel 24 described above, allowing the blanks to be continuously formed by blowing.

The various steps/stations for forming the blank involving this carrousel for manufacture by blowing according to the embodiment of the invention more particularly described here have been shown with the references 41 to 69.

After preparation of the batch materials in the defined proportions, successive batches are introduced into the furnace in order to feed the glass melt. The glass paste is thus heated in a known manner to a temperature of 1300° C. to 1500° C., at which it is maintained for a specified melting time within the competence of a person skilled in the art.

The molten paste flows slowly toward the carrousel, to be removed at a temperature of around 1150° C. from a bowl, the formation of the blank then taking place according to the following steps:

41. Preparation of the glass (bowl temperature);
42. Formation of the gob (feeder plunger);
43. Cutting of the gob (shears);
44. Position of the gob on the marver;
45. Pressing of the gob into a disk shape;
46. Transfer and deposition on the table;
47. Localized cooling of the disk;
48. Stretch cooling;
49. Water spraying into the furnished half-molds;
50. Start of rotation of the table;
51. Removal of excess water from the molds;
52. Self-formation of the parison;
53. Lowering of the ring-forming nozzle;
54. 1st blowing into the parison;
55. Blowing on to outside of the parisons;
56. 2nd blowing into the parison;
57. Closure of the molds;
58. 1st fill blowing;
59. 2nd finish blowing;
60. Rise of the nozzle;
61. Opening of the mold;
62. Reheat torch;
63. Table rotation stoppage;
64. Separation of the ring in the blank;
65. Ejection of the blank;
66. Ejection of the ring, spraying of the tables;
67. Air cooling of the tables;
68. Conveying of the objects to the cooling lehr; and
69. Entry into the cooling lehr in order to eliminate only the thermal stresses.

Steps 41 to 69 last from about 30 seconds to 2 minutes depending on the sequential rotation speed of the carrousel.

It goes without saying, and as also results from the foregoing, the present invention is not limited to the embodiments more particular described. On the contrary, it embraces all the variants thereof and especially those in which it is tubes and not blanks that are thus produced.

In the case of processes for manufacturing tubes, several known systems are applicable, those known as the Danner system and the Vello system.

More precisely, there are four methods for the industrial production of glass tubes, of which the above two methods represent more than 90% of the total production.

With the Danner system, the molten glass, with the correct viscosity, flows as a stream via a small trough (pouring lip) onto a hollow mandrel, generally made of refractory material.

This mandrel is inclined downward at an angle of about 30°.

The mandrel has a length of about 1 m to 1.5 m and a diameter, depending on the manufacture, of 15 to 30 cm. The mandrel undergoes a slow rotation movement allowing the glass as its flows to be wound around this refractory tube with a uniform thickness.

The drawing takes place from that end of the mandrel into which low-pressure air is blown, allowing the formation of a glass tube whose diameter and thicknesses are dependent on the viscosity of the glass, on the type of mandrel, on the amount of air injected and above all on the drawing speed.

Over its first few drawing meters, the still red tube is kept in an isothermal box so as to avoid thermal shocks, and it then undergoes controlled cooling. As soon as the temperature and the viscosity allow it, the tube rests on edge rolls so as to allow it to be guided during the cooling operation.

The tube is thus drawn over distances of 30 to 100 m, during which it undergoes continuous diameter checks, (by laser) which regulate the speed of the drawing system, before being cut to size generally by thermal shocks and then possibly fire-polished at the ends before being packaged.

The Vello system allows better control and superior quality in the constancy of the thicknesses. In addition, the absence of a mandrel reduces the down-time due to the mandrel being changed (frequent wear and breakage) and also to line "start-up" problems.

This system includes a conventional bowl at the outlet of the furnace provided with a calibrated orifice (bushing) located high above the floor.

A tube provided with a cone, the base of which limits the flow area of the bushing orifice. Air is also injected in order to form a tube (the manufacture of rods takes place without air, but the principle is the same). According to this principle, the glass flows naturally under gravity on the one hand aided by the force determined by the drawing speed, forming a very ample curve.

The rest of the process is the same as the first process.

The two processes (Danner & Vello) described above are fed with glass via tank furnaces, the design and the technology of which are identical to that described above except in the terminal part. The daily output of tubes according to the invention is thus between about five tonnes per day to several tens of tonnes per day.

For the application more particularly described according to the invention, that is to say the production of amber tubes for the purpose of converting them into forms such as bulbs intended for is illumination, the diameters may vary from 5 to 40 mm.

Preferably, and for the purpose of being mainly used for signaling illumination, the cross section of the tubes will be between 5 mm and 20 mm.

Independently of the expansion coefficient, which will remain fixed and suitable for the welding to other glasses (filament base) without creating tensile forces that may induce fractures, the physico-chemical properties will be adaptable to the forming methods and to the types of melting, particularly as regards the viscosity that may be modified, to a certain extent, depending on the required conditions for drawing the tube, its conversion into a lamp or its fitting into a bulb by sealing it on automated machines.

Thus, the temperature interval during which the glass can be fashioned hot, also called the working range, may be extended or reduced in the viscosity ranges from $\eta=3$ dPa to $\eta=7.6$ dPa with regard to the drawing operation or in the viscosity range $\eta=6$ dPa to $\eta=9$ dPa in the case of conversion/sealing work.

The adjustments are performed on the chemicals of the batch fed into the furnace by transfer and by replacement of a fraction of one chemical with another as a percentage of their molar mass according to the proportions as described above.

To summarize, the manufacture of tubes using the invention allows amber glass tubes to be obtained that contain no toxic materials subject to regulations and/or environmentally hazardous materials, such as lead, cadmium, selenium or chromium. It makes it possible to maintain the particular feature whereby the glass obtained has a color produced directly without intermediate or additional operations in which the temperature is raised for a considerable time, said color complying with the international standards for signaling that are in force, being stable over time and invariant, both when reheating the tube in order to convert it and when forming a bulb and finally sealing it.

The invention claimed is:

1. A glass batch based on a soda-lime-silica composition for obtaining a bulk-tinted amber glass, characterized in that said batch comprises, per 100% by weight of batch, 0.01% to 1% molybdenum disulfide by weight and 0.01% to 7% strontium sulfide by weight.

2. A batch as claimed in claim 1, characterized in that the percent of strontium sulfide does not exceed 4% of the weight of the batch.

3. The batch as claimed in claim 1, characterized in that the percent of molybdenum disulfide does not exceed 0.3% of the weight of the batch.

4. The batch as claimed in claim 1, characterized in that the iron content of the batch is less than 0.04%.

5. The batch as claimed in claim 1, characterized in that the batch contains no free sulfur.

6. The batch as claimed in any claim 1, characterized in that it includes up to 0.2% aluminum in powder form.

7. A process for manufacturing a tube or a blank made of amber glass from a batch based on a soda-lime-silica composition, characterized in that the batch is produced by adding to the composition comprising between 65 and 72% $SiO_2$ and between 5 and 15% $Na_2O$, per 100% by weight of batch, 0.01% to 1% molybdenum disulfide by weight and 0.01% to 7% strontium sulfide by weight, then the glass is produced in a furnace from said batch, and the tube or the blank is formed directly with its definitive color without any additional heat treatment other than controlled cooling in order to eliminate thermal stresses.

8. The process for manufacturing a blank as claimed in claim 7, characterized in that the percent of strontium sulfide does not exceed 4% of the weight of the batch.

9. The process for manufacturing a blank as claimed in claim 7, characterized in that the percent of molybdenum disulfide does not exceed 0.3% of the weight of the batch.

10. The process for manufacturing a blank as claimed in claim 7, characterized in that the iron particles are eliminated magnetically so that the iron content of the batch is less than 0.04%.

11. The process for manufacturing a blank as claimed in claim 7, characterized in that the batch contains no free sulfur.

12. The process for manufacturing a blank as claimed in claim 7, characterized in that the shade of the tint of the glass is controlled by modifying the oxidation-reduction parameters inside the heating furnace by adjustment of the amount of a metal-powder-based reducing agent up to an amount of 0.3% by weight of the batch.

13. An amber glass bulb for a lighting system, obtained from a blank or a tube produced by the process as claimed in claim 7, for use as an automobile flasher or signaling means.

* * * * *